(12) United States Patent
Hyeon et al.

(10) Patent No.: US 9,355,610 B2
(45) Date of Patent: May 31, 2016

(54) POWER SUPPLY AND METHOD FOR CONTROLLING THE SAME

(71) Applicant: SAMSUNG ELECTRONICS CO., LTD., Suwon-si (KR)

(72) Inventors: Byeong-cheol Hyeon, Suwon-si (KR); Joon-hyun Yang, Suwon-si (KR); Sang-hoon Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/231,960

(22) Filed: Apr. 1, 2014

(65) Prior Publication Data

US 2014/0354168 A1    Dec. 4, 2014

(30) Foreign Application Priority Data

Jun. 3, 2013    (KR) .................. 10-2013-0063746

(51) Int. Cl.
| | |
|---|---|
| H02M 3/04 | (2006.01) |
| G09G 5/00 | (2006.01) |
| H05B 37/02 | (2006.01) |
| G09G 3/34 | (2006.01) |
| G09G 3/32 | (2016.01) |
| H02M 3/158 | (2006.01) |
| H02M 1/00 | (2006.01) |

(52) U.S. Cl.
CPC .............. G09G 5/00 (2013.01); G09G 3/3406 (2013.01); H02M 3/158 (2013.01); H05B 37/02 (2013.01); G09G 3/3208 (2013.01); G09G 2320/0252 (2013.01); G09G 2320/0646 (2013.01); G09G 2330/021 (2013.01); G09G 2330/028 (2013.01); H02M 3/1588 (2013.01); H02M 2001/0025 (2013.01); Y02B 70/1466 (2013.01)

(58) Field of Classification Search
CPC ......... H02M 3/06; H02M 3/07; H02M 3/158; H05B 37/02
See application file for complete search history.

(56) References Cited

U.S. PATENT DOCUMENTS

| | | | | |
|---|---|---|---|---|
| 5,345,376 | A * | 9/1994 | Nourbakhsh | H02M 3/158 323/351 |
| 7,638,987 | B2 * | 12/2009 | Sugiyama | H02M 3/156 323/222 |
| 7,872,458 | B2 * | 1/2011 | Ishii | H02M 3/156 323/271 |
| 8,558,529 | B2 * | 10/2013 | Sakai | H02M 3/1588 323/283 |
| 2002/0185994 | A1 * | 12/2002 | Kanouda | H02M 3/158 323/282 |
| 2006/0071651 | A1 * | 4/2006 | Ito | H02M 3/1588 323/351 |
| 2008/0174607 | A1 | 7/2008 | Iranli | |
| 2008/0252271 | A1 * | 10/2008 | Iwamura | H02M 3/1588 323/271 |

OTHER PUBLICATIONS

Communication dated Apr. 23, 2014, issued by the European Patent Office in counterpart application No. 14159421.8.
Asami, Naoki et al., "Crusoe Microprocessor Meets Low-Power Needs", Nikkei Electronics Asia—Tech on!, Jun. 1, 2000, 6 pages.

* cited by examiner

Primary Examiner — Jason M Crawford
Assistant Examiner — Kurtis R Bahr
(74) Attorney, Agent, or Firm — Sughrue Mion, PLLC

(57) ABSTRACT

A power supply includes an inputter including an input capacitor and configured to receive an input DC voltage, a converter including an output capacitor and configured to convert the input DC voltage and to output the converted DC voltage, and a controller configured to control the converter to output a voltage corresponding to a reference voltage.

18 Claims, 8 Drawing Sheets

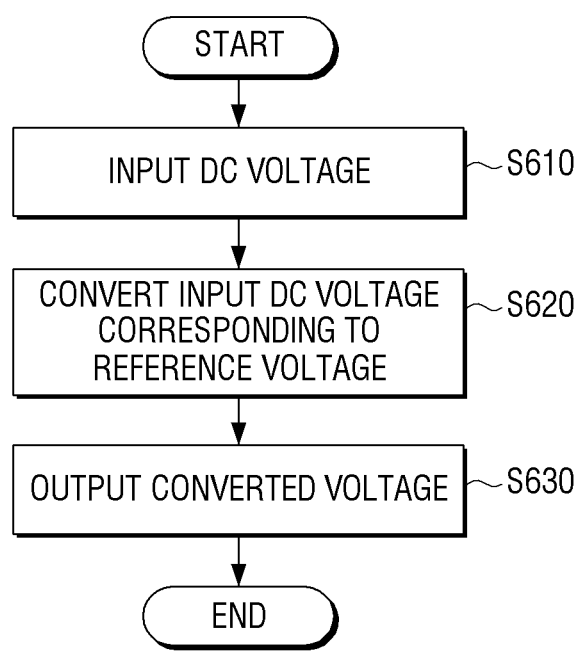

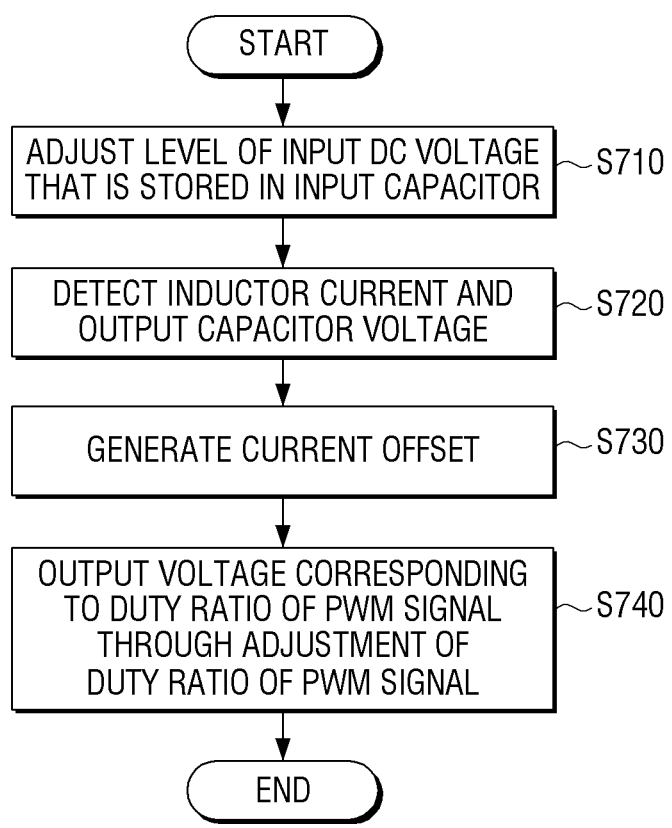

POWER SUPPLY AND METHOD FOR CONTROLLING THE SAME

PRIORITY

This application claims priority from Korean Patent Application No. 10-2013-0063746, filed on Jun. 3, 2013, in the Korean Intellectual Property Office, the disclosure of which is incorporated herein by reference.

BACKGROUND

1. Field

Apparatuses and methods consistent with the present disclosure relate to a power supply and a method for controlling the same, and more particularly to a power supply and a method for controlling the same, which can change driving voltages of a display device.

2. Description of the Related Art

In Liquid Crystal Display (LCD), Light Emitting Diode (LED) (including UHD), and Organic Light Emitting Diode (OLED) display devices that are recently in the limelight, panels may be driven using a DC driving voltage.

In this case, in order to optimize a backlight during operation of a display device, it is sometimes necessary to change the drive voltages in real time.

A voltage changing speed depends on the output capacitance of the drive circuit, the characteristics of the drive circuit, and the input voltage and load conditions of the drive circuit. In this case, voltage lowering is mainly determined by the output capacitance and the load state regardless of the performance of the drive circuit.

On the other hand, an LED backlight for a UHD and a drive circuit for generating a driving voltage for an OLED have a large output capacitance value due to their large current amount, and in order to lower the driving voltage at no-load condition, much time is required. Accordingly, it is difficult to meet requirements for the voltage change time of a panel, and thus the picture quality may deteriorate or the power consumption may be increased.

SUMMARY

One or more exemplary embodiments provide a power supply and a method for controlling the same, which can rapidly change a driving voltage as compared with the related art, and can rapidly lower the voltage at no-load condition so that such change exerts less influence on the picture quality and power consumption.

According to an aspect of an exemplary embodiment, there is provided a power supply including an inputter including an input capacitor and configured to receive an input of a DC voltage; a converter including an output capacitor and configured to convert the input DC voltage and to output the converted DC voltage; and a controller configured to control the converter to output a voltage corresponding to a reference voltage, wherein in response to the reference voltage being changed, the controller controls the converter to provide the voltage stored in the output capacitor to the input capacitor based on the changed reference voltage.

The inputter may further includes a regulator configured to adjust the input DC voltage and to provide the adjusted DC voltage to the input capacitor, wherein the controller, in order to store the voltage provided from the output capacitor in the input capacitor, controls the regulator to adjust a level of the input DC voltage that is stored in the input capacitor.

The converter may include a first switch having one end connected to one end of the input capacitor; a second switch having one end connected to the other end of the first switch and the other end connected to the other end of the input capacitor; an inductor having one end connected to the other end of the first switch and the one end of the second switch; and an output capacitor having one end connected to the other end of the inductor and the other end connected to the other end of the second switch.

The controller may include a variable voltage driving circuit configured to generate a current offset for changing a direction of current flowing through the inductor, and to adjust the reference voltage; a current detector configured to detect the current flowing through the inductor; a voltage detector configured to detect a voltage of the output capacitor; and a pulse width modulation (PWM) signal generator configured to generate a PWM signal for alternately controlling the first switch and the second switch based on the current offset, the detected inductor current, the detected output capacitor voltage, and the changed reference voltage.

The variable voltage driving circuit may output the current offset to the current detector in synchronization with a time point when the reference voltage is input to the PWM signal generator.

The controller may control the variable voltage driving circuit to generate the current offset based on the reference voltage.

The reference voltage and the current offset may be kept constant in the same frame period, but may be changeable when a frame is changed.

The controller may operate to adjust a duty ratio of the PWM signal based on the changed reference voltage and to output a voltage corresponding to the adjusted PWM duty ratio.

According to an aspect of another exemplary embodiment, there is provided a display device including a display panel; and a power supply configured to supply a power corresponding to a reference voltage to the display panel, wherein the power supply includes an inputter including an input capacitor and configured to receive an input of a DC voltage; a converter including an output capacitor and configured to convert the input DC voltage and to output the converted DC voltage; and a controller configured to, in response the reference voltage is changed, control the converter to provide the voltage stored in the output capacitor to the input capacitor based on the changed reference voltage.

According to still another aspect of an exemplary embodiment, there is provided a method for controlling a power supply including an input capacitor and an output capacitor, the method including receiving an input of a DC voltage; converting the input DC voltage corresponding to a reference voltage; and outputting the converted DC voltage, wherein the converting includes, in response to the reference voltage being changed, providing the voltage stored in the output capacitor to the input capacitor based on the changed reference voltage.

The method for controlling a power supply may further include adjusting a level of the input DC voltage that is stored in the input capacitor in order to store the voltage provided from the output capacitor in the input capacitor.

The method for controlling a power supply may further include detecting the current flowing through an inductor included in a converter and a voltage of the output capacitor; and generating a current offset for changing a direction of current flowing through the inductor included in the converter, wherein the converting includes generating a PWM signal for alternately controlling a first switch and a second switch included in the converter based on the current offset, the detected inductor current, the detected output capacitor voltage, and the changed reference voltage.

The generating of the current offset may include generating the current offset based on the reference voltage.

The reference voltage and the current offset may be kept constant in the same frame period, but may be changeable when a frame is changed.

The method for controlling a power supply may further include adjusting a duty ratio of the PWM signal based on the changed reference voltage and outputting a voltage corresponding to the adjusted PWM duty ratio to a light source.

BRIEF DESCRIPTION OF THE DRAWINGS

The above and other aspects will be more apparent from the following detailed description of exemplary embodiments when taken in conjunction with the accompanying drawings, in which:

FIG. 6 is a flowchart illustrating a method for controlling a power supply according to an exemplary embodiment; and FIG. 7 is a flowchart illustrating a procedure of generating a current offset and a PWM signal according to an exemplary embodiment.

DETAILED DESCRIPTION

Hereinafter, various exemplary embodiments will be described in detail with reference to the accompanying drawings.

Figure 1A:
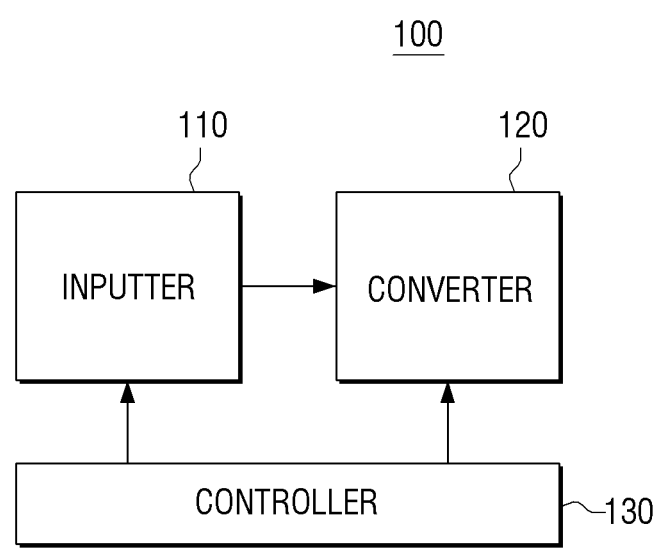
FIGS. 1A and FIG. 1B are diagrams illustrating a configuration of a power supply according to exemplary embodiments.
Figure 1B:
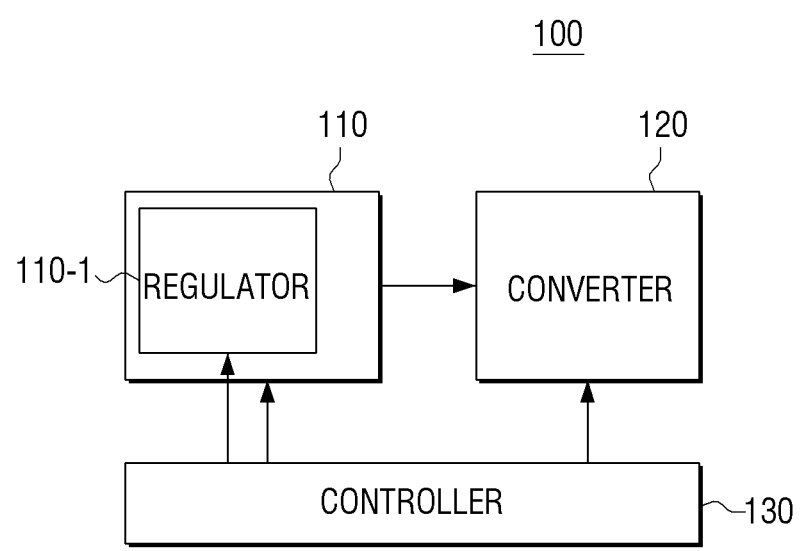

FIGS. 1A and FIG. 1B are diagrams illustrating a configuration of a power supply according to exemplary embodiments.

Referring to FIG. 1A, a power supply 100 includes an inputter 110, a converter 120, and a controller 130.

The power supply 100 supplies power to a display device, and may supply the power to a display element or a backlight power source according to an implementation example of the display device. Additionally, the power supply 100 may be applied to other types of devices.

The display element may be an Organic Light Emitting Diode (OLED). The OLED may also be referred to as an organic EL, and denotes a "self-luminescent organic material" which emits light for itself using an electroluminescent phenomenon that emits light when current flows to phosphorus organic compounds.

Further, since the display device can be made as a thin film type, can be driven at low voltage, and has a wide viewing angle and a rapid response speed, it is mainly used as a display of a small appliance, such as a portable phone, a car audio, or a digital camera.

As described above, since the OLED is self-luminescent and does not use a backlight, the power supply 100 may directly flow current to the OLED to make the OLED emit light.

On the other hand, an LCD may also be referred to as a LCD device. Although the LCD is not self-luminescent (unlike a Cathode Ray Tube (CRT)), and thus uses a backlight, the LCD has a low operating voltage and low power consumption, and thus may be used as a portable device. Since the LCD is not self-luminescent and uses a backlight, the power supply 100 may supply the power to the backlight.

The inputter 110 includes an input capacitor, and receives a DC input. The input capacitor denotes capacitance between input terminals of an ideal capacitor (for example, between input terminals of a vacuum tube), and if a voltage is applied thereto, the input capacitor can store the voltage that is applied from the DC power as storing charge therein.

Further, referring to FIG. 1B, the inputter 110 may include a regulator (110-1) that adjusts the input DC voltage and provides the adjusted DC voltage to the input capacitor. The regulator (110-1) serves to keep a constant voltage even if the incoming voltage is changed or the current consumption is changed.

Accordingly, it is generally the case that the input capacitor is charged as high as the level of the input DC voltage. If a voltage is applied from another device other than the DC voltage source, the controller 130 controls the regulator (110-1) to adjust the input of the DC voltage, and thus the voltage at both ends of the input capacitor can be always kept constant.

The converter 120 includes an output capacitor, and may convert the input DC voltage to output the converted DC voltage. The converter 120 may be implemented as a DC-DC converter, for example, a circuit, such as a buck converter, a synchronous buck converter, or a boost converter, etc. A switching type pulse width modulation (PWM) converter may also be used.

Specifically, the DC-DC converter denotes an electronic circuit device that converts a DC power of a certain voltage into a DC power of another voltage.

Accordingly, the converter 120, which is implemented, for example, as the DC-DC converter, may serve to convert the voltage input from a DC voltage source into a DC voltage of a different voltage.

On the other hand, the switching type PWM converter controls a switch using a PWM signal, such that an average value of the output voltages become the DC voltage.

The controller 130 may control the converter 120 to output a voltage corresponding to a reference voltage. When the reference voltage is changed, the controller may control the converter 120 to provide the voltage stored in the output capacitor to the input capacitor based on the change reference voltage.

For example, when a frame is changed in a state where the display device displays an image, image information may be changed, and when the image information is changed, the brightness of the light source may be change, and it may be advantageous to change the reference voltage. The controller 130, in order to output the voltage corresponding to the changed reference voltage, can rapidly change the voltage corresponding to the changed reference voltage to output the changed voltage through providing of the voltage stored in the output capacitor to the input capacitor.

On the other hand, in the same frame period, when the image information is not changed, the reference voltage is kept constant, and thus the converter 120 is not used to control to provide the voltage stored in the output capacitor to the input capacitor. However, when the frame is changed, the image information may be changed, and thus the reference voltage may be changed. Accordingly, the controller 130 may control the converter 120 to provide the voltage stored in the output capacitor to the input capacitor based on the changed reference voltage.

Further, the controller 130 may perform a control operation in accordance with pulse width modulation of a control pulse, and for example, may be implemented as a PWM signal generator that supplies a switching signal for PWM control according to a PWM signal.

The controller 130 may adjust the duty ratio of the PWM signal based on the changed reference voltage, or may output a voltage corresponding to the adjusted PWM duty ratio. The duty ratio may denote the ratio of occupation of an ON signal in the PWM signal of one period. That is, the duty ratio may denote the amount of time the PWM signal is ON in one period.

Hereinafter, a more detailed description will be provided with reference to a block diagram of a power supply and to a signal waveform diagram.

Figure 2:
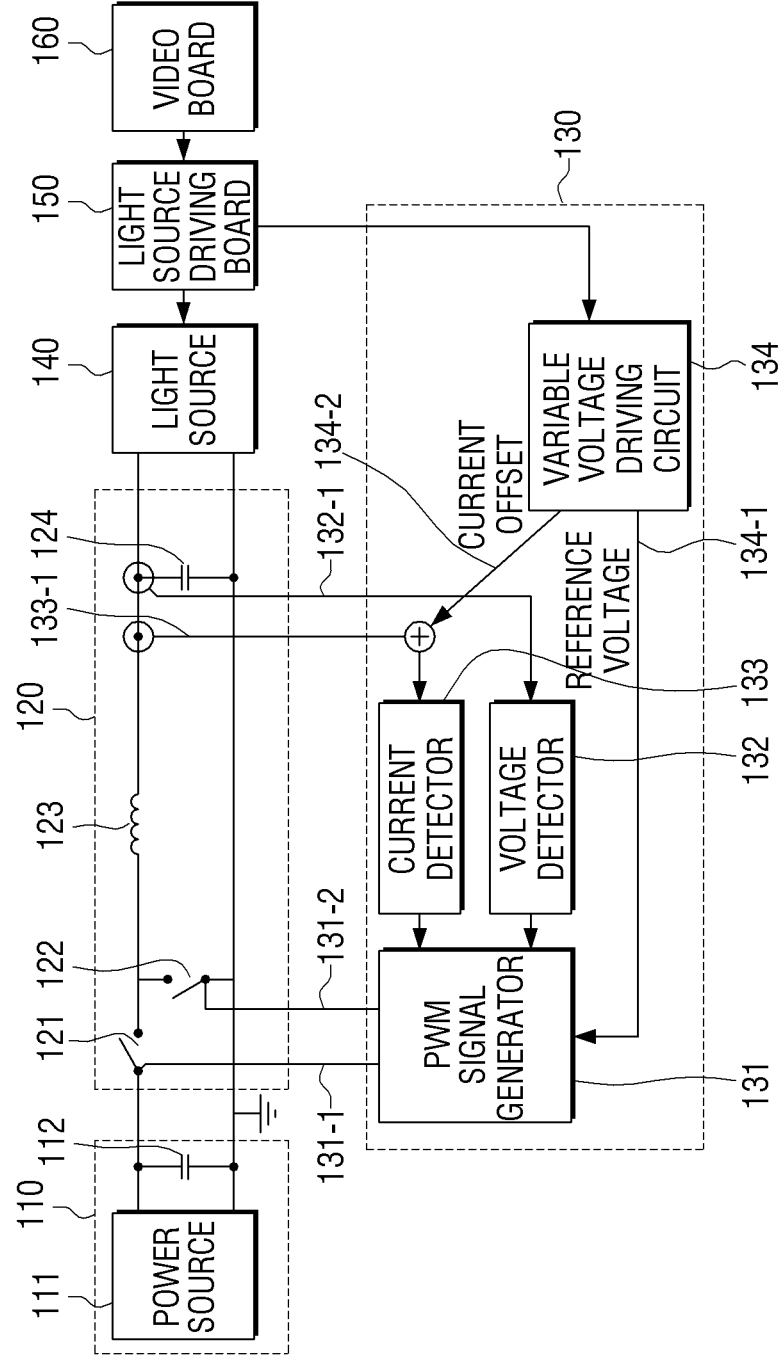
FIG. 2 is a block diagram illustrating a detailed configuration of a power supply according to an exemplary embodiment.
Figure 3:
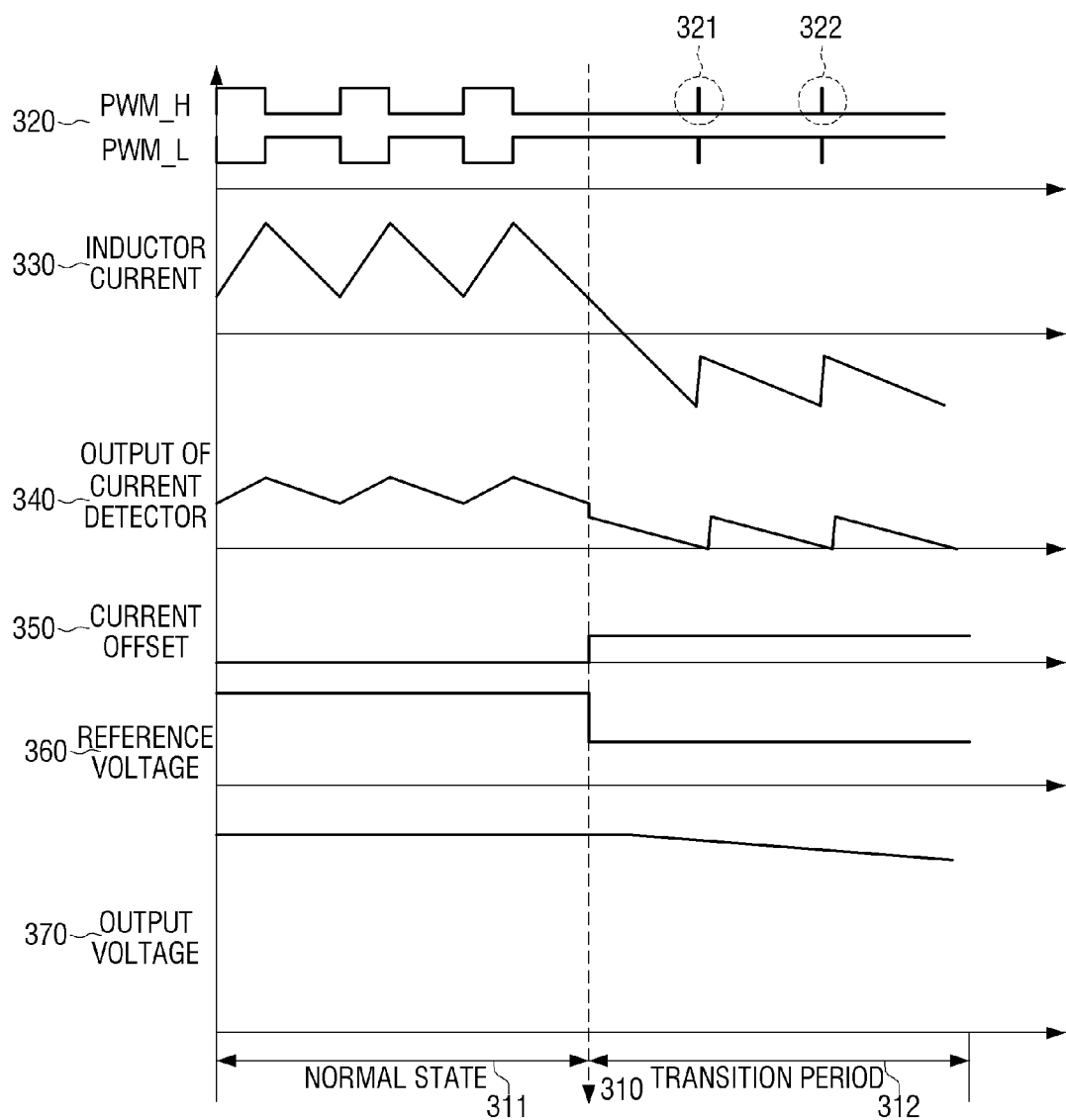
FIG. 3 is a diagram illustrating an example of operating waveforms of a power supply according to an exemplary embodiment.

FIG. 2 is a block diagram illustrating a detailed configuration of a power supply according to an exemplary embodiment, and FIG. 3 is a diagram illustrating an example of operating waveforms of a power supply according to an exemplary embodiment.

As shown in FIG. 2, the detailed block diagram shows a light source 140, a light source driving board 150, a video board 160, and the power supply 100, including the inputter 110, the converter 120, and the controller 130. The inputter 110 may include a power source 111, an input capacitor 112, and a regulator (110-1). Since the functions of the input capacitor and the regulator (110-1) are the same as those as described above, a description thereof will be omitted.

The controller 130 can secure the capacitance for storing the voltage that is provided from the output capacitor through adjustment of the level of the input DC voltage that is stored in the input capacitor using the regulator (110-1) so as to store the voltage provided from the output capacitor in the input capacitor.

Accordingly, the controller 130 may recover the voltage stored in the output capacitor 124 to the inputter 110.

The converter 120 may include a first switch 121 having one end connected to one end of the input capacitor 112, a second switch 122 having one end connected to the other end of the first switch 121 and the other end connected to the other end of the input capacitor 112, an inductor 123 having one end connected to the other end of the first switch 121 and the one end of the second switch 122, and an output capacitor 124 having one end connected to the other end of the inductor 123 and the other end connected to the other end of the second switch 122.

Here, the first switch 121 and the second switch 122 may be implemented as switches using transistors, or as general on/off switching elements.

Further, when the first switch 121 is connected, current flows from the power source 111 to the light source 140, and when the second switch 122 is connected, a closed circuit including the inductor 123 and the output capacitor 124 may be created. The inductor 123 is a coil that induces the voltage in proportion to the changed amount of current, and makes the current flow continuously through an electromotive force that is generated by electromagnetic induction according to the change of the current flowing through the circuit.

Accordingly, when the second switch 122 is connected, the power supply that is applied from the power source 111 is intercepted, but due to the properties of the inductor 123, the current flows continuously to the side of the output capacitor 124. When a predetermined time elapses and the electromotive force becomes "0", current does not flow. Here, the output capacitor 124 can be continuously charged through the current flowing to the output capacitor.

Accordingly, as shown as a waveform 330 of the inductor current illustrated in FIG. 3, in a normal state 311, that is, in the same frame period, the first switch 121 is turned on by the controller 130, and when the second switch 122 is turned off, the inductor current that flows toward the light source 140 is increased. When the first switch 121 is turned off and the second switch 122 is turned on, the inductor current that flows toward the light source 140 is decreased.

Accordingly, the first and second switches repeat alternate on/off operations, and a triangle waveform appears like a waveform 330 of the inductor current in the normal state 311 illustrated in FIG. 3.

On the other hand, an average value of the top point and the bottom point of the triangle waveform of the inductor current in a normal state 311 becomes the voltage value that is output from the converter 120.

Accordingly, the converter 120 may change the DC voltage value input to the inputter 110 to a desired output voltage through the operation of the first and second switches 121 and 122 that are alternately controlled by the controller 130.

The controller 130 may include a variable voltage driving circuit 134 configured to generate a current offset 134-2 for changing the direction of the current flowing through the inductor 123 and to adjust a reference voltage 134-1, a current detector 133 configured to detect the current flowing through the inductor 123, a voltage detector 132 configured to detect a voltage of the output capacitor 124, and a PWM signal generator 131 configured to generate PWM signals 131-1 and 131-2 for alternately controlling the first and second switches 121 and 122 based on the current offset 134-2, the detected inductor current 133-1, the detected output capacitor voltage 132-1, and the changed reference voltage 134-1. The PWM signals 131-1 and 131-2 may include the signal 131-1 of PWM_H for turning on/off the first switch 121 and the signal 131-2 of PWM_L for turning on/off the second switch 122.

Further, the variable voltage driving circuit 134 of the controller 130 may perform control to generate the current offset 134-2 based on the reference voltage 134-1.

Specifically, the variable voltage driving circuit 134 may adjust the current offset 134-2 and transfer the changed reference voltage 134-1 to the PWM signal generator 131. Here, the current offset 134-2 is generated to change the direction of the current flowing through the inductor 123. The actual inductor current 133-1 detected by the current detector 133 and the current offset 134-2 may be added together, and a detection value that is larger than the actual inductor current value 133-1 may be transferred to the PWM signal generator 131.

Further, the changed reference voltage 134-1 may be determined by a light source driving board 150 and the variable voltage driving circuit 134 to adjust the brightness of the light source according to the image information when the frame is changed.

That is, when the image is changed from a bright image to a dark image when the frame is changed, the brightness of the light source is reduced, and the reference voltage 134-1 may be changed to a low level by the light source driving board 150 and the variable voltage driving circuit 134.

The variable voltage driving circuit 134 may output the current offset 134-2 to the current detector 133 in synchronization with the time point when the reference voltage 134-1 is input to the PWM signal generator 131. Accordingly, a value obtained by adding the current offset 134-2 to the actual inductor current 133-1 that is detected by the current detector 133 in synchronization with the changed reference voltage 134-1 may be input to the PWM signal generator 131.

Here, according to the driving characteristic of the PWM signal generator 131, the current detection value is increased by the current offset 134-2, and the changed reference voltage 134-1 becomes lower than the existing output voltage. Accordingly, in order to output the voltage corresponding to the changed reference voltage 134-1, the controller 130 may abruptly reduce the ON signal of PWM_H (i.e., decrease the duty ratio) to transfer the power to the light source among the PWM signals of the PWM signal generator 131.

The waveforms of the PWM_H signal 131-1 and the PWM_L signal 131-2 for controlling the first switch 121 and the second switch 122 are reversed by the PWM signal generator 131 in order to alternately control the first switch 121 and the second switch 122, respectively.

Accordingly, when the PWM signal generator 131 abruptly reduces the ON signal of PWM_H to output the voltage corresponding to the changed reference voltage that is lower than the existing output voltage, the ON signal of PWM_L is abruptly increased (i.e., the duty ratio is increased).

Further, when the ON signal of PWM_H is reduced, the input of the DC voltage that comes into the converter 120 is intercepted for a predetermined time, the ON signal of PWM_L is increased, and the current of the inductor 123 that flows toward the light source 140 is reduced.

On the other hand, when the current offset 134-2 is increased to be larger than a reference value of a current controller or a comparator in the PWM signal generator 131, the actual inductor current is lowered to have a negative value.

That is, if the current offset 134-2 is increased to be larger than the reference value, the current detection value input to the PWM signal generator 131 becomes larger than the reference value, and thus in order to output the voltage corresponding to the reference voltage that is changed to be lower than the existing output voltage, the controller 130 may operate to make the actual inductor current flow toward the power source 111 through further reduction of the ON signal of PWM_H 131-1 and further increase of the ON signal of PWM_L 131-2.

As the ON signal of PWM_L 131-2 is increased, the actual inductor current may flow toward the power source 111, and if the ON signal of PWM_H 131-1 that is larger than a minimum value is input at this time, the voltage stored in the output capacitor 124 may be transferred to the input capacitor 112.

The minimum value PWM_H signal 131-1 may differ depending on the PWM signal generator 131.

The operating waveforms illustrated in FIG. 3 are PWM_H and PWM_L waveforms 320, an inductor current waveform 330, a current detector output waveform 340, a current offset waveform 350, a reference voltage waveform 360, and an output voltage waveform 370.

The reference voltage waveform 360 may indicate the time point 310 when the variable voltage driving circuit outputs the changed reference voltage.

The current offset waveform 350 may indicate that the variable voltage driving circuit outputs the current offset in synchronization with the time point 310 when the variable voltage driving circuit outputs the changed reference voltage. At this time, the value obtained by adding the current offset to the actual inductor current that is detected by the current detector may be input to the PWM signal generator.

Further, the waveforms 320 of the PWM_H and PWM_L signals may indicate that since the current detection value is increased by the current offset and the changed reference voltage becomes lower than the existing output voltage according to the driving characteristic of the PWM signal generator, in order to output the voltage corresponding to the changed reference voltage, the controller abruptly reduces the ON signal of PWM_H to transfer the power to the light source and abruptly increases the ON signal of PWM_L among the PWM signals of the PWM signal generator.

The inductor current waveform 330 may indicate that the inductor current flowing toward the light source is gradually reduced as the ON signal of PWM_H is reduced and the ON signal of PWM_L is increased, and if the current offset level is larger than a reference value of the current controller or the comparator in the PWM signal generator, the inductor current operates as a negative value to flow toward the power source.

Further, in a transition period 312, whenever the ON signals 321 and 322 of PWM_H of a minimum value are input, the inductor current flows toward the power source, and thus the voltage stored in the output capacitor can be transferred to the input capacitor.

The current detector output waveform 340 may indicate that the current offset is added to the result of the scale down of the inductor current. The PWM signal generator may compare the current detector output waveform 340 and the reference voltage waveform 360 with each other and may output the signal waveforms 320 of PWM_H and PWM_L.

The output voltage waveform 370 may indicate that the voltage stored in the output capacitor can be transferred to the input capacitor as the ON signal of PWM_H is reduced, the ON signal of PWM_L is increased, and the ON signals 321 and 322 of PWM_H of the minimum value are input, and the output voltage is changed to correspond to the change reference voltage.

Further, although not illustrated, the power supply 100 may further include a protector (not illustrated).

The protector (not illustrated) may protect at least one light emitting element if it is determined that the at least one light emitting element (not illustrated) and the power supply 100 are in a short-circuit state.

Specifically, the protector (not illustrated) may perform a protection procedure to intercept the driving power that is applied to the input end of the power supply 100.

For example, the protector (not illustrated) may perform an overvoltage protection (OVP) procedure. The OVP procedure may be a function to shut down the output, for example, to turn off the switch that is connected to the light emitting element to apply the power thereto, if the current voltage exceeds a threshold voltage. The threshold voltage may be predetermined.

In addition, the protector (not illustrated) may also perform protection procedures, such as Over Current Protection (OCP), Over Load Protection (OLP), Over Temperature Protection (OTP), and Short Circuit Protection (SCP).

In the above-described exemplary embodiments, it is described that the controller 130 and the protector (not illustrated) are provided in the power supply 100. However, the controller 130 and the protector (not illustrated) may be implemented as constituent elements separately from the power supply 100.

Figure 4:
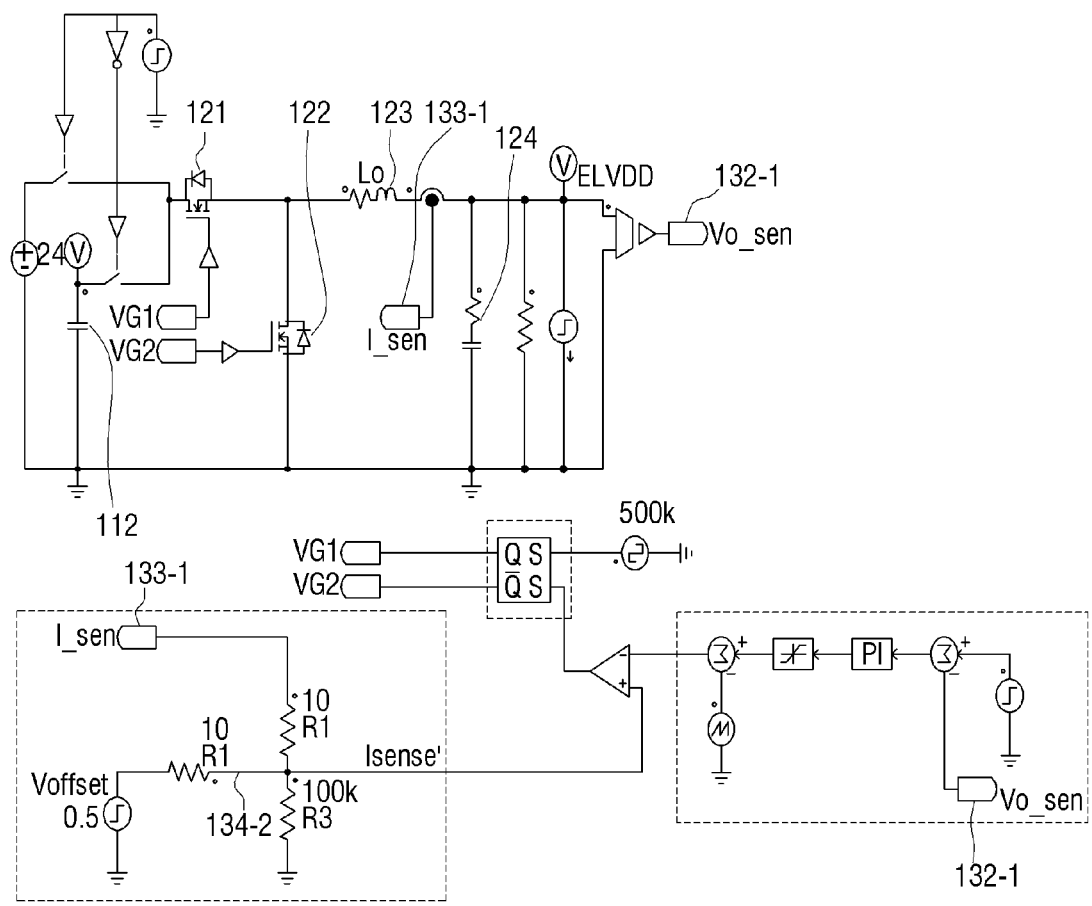
FIG. 4 is a diagram illustrating a detailed configuration of a PWM signal generator, a current detector, a voltage detector, and a current offset circuit of a controller according to an exemplary embodiment.

FIG. 4 is a diagram illustrating a detailed configuration of a PWM signal generator, a current detector, a voltage detector, and a current offset circuit of a controller.

The current offset generated through the input of the voltage offset is input to an operational amplifier (OP-AMP) in addition to the detected inductor current, the detected output capacitor voltage and the change reference voltage are input to the OP-AMP, and the PWM signal may be generated from a Q/S latch according to a Q/S truth table.

Figure 5:
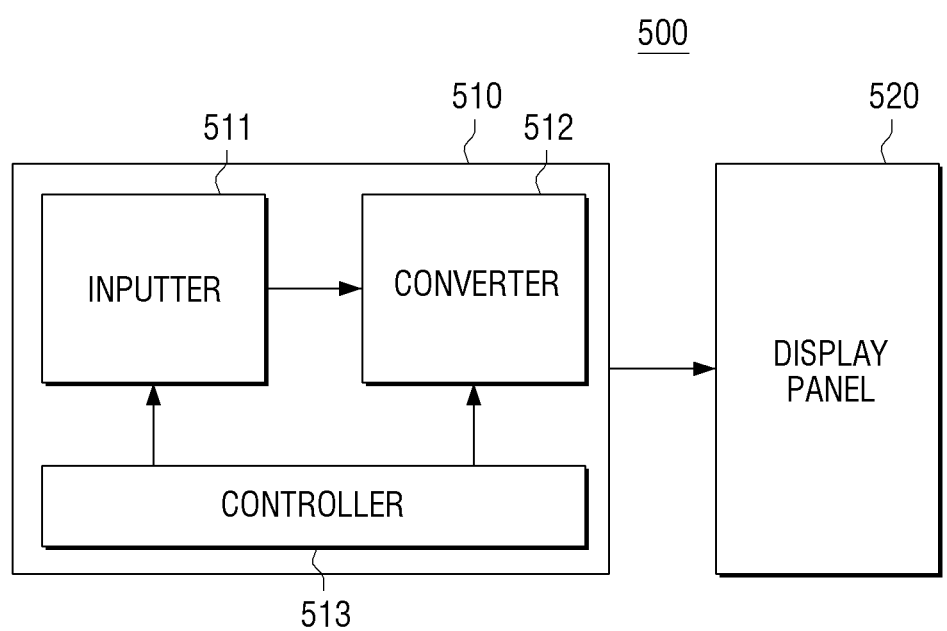
FIG. 5 is a block diagram illustrating a configuration of a display device according to an exemplary embodiment.

FIG. 5 is a block diagram illustrating a configuration of a display device according to an exemplary embodiment.

Referring to FIG. 5, a display device 500 includes a display panel 520 and a power supply 510.

Specifically, the power supply 510 may include an inputter 511, a converter 512, and a controller 513. The inputter 511 may include an input capacitor and receive an input of the DC voltage, and the converter 512 may include an output capacitor and convert the input DC voltage to output the converted DC voltage. The controller 513 may control the converter 512 to provide the voltage stored in the output capacitor tot the input capacitor based on the changed reference voltage.

On the other hand, the display device 500 may be a display device having an LCD, LED (including UHD), and/or OLED, etc.

In general, since an LCD TV is not self-luminescent, it includes an LCD backlight unit (BLU) that projects backlight onto the LCD panel. Accordingly, the power supply 100 supplies the power to the LCD BLU.

Further, the display panel 520 may be implemented as an OLED panel.

Since the OLED is self-luminescent and does not use a backlight, the power supply 100 may directly flow current to the OLED to make the OLED emit light.

In addition, the display device 500 may include a video inputter (not illustrated) and a video processor (not illustrated).

The video inputter (not illustrated) may include a plurality of input terminals. Through these input terminals, the video inputter (not illustrated) receives an input of a component video signal, a Super-Video Home System (S-VHS) video signal, and a composite video signal from external devices, such as a video player and a DVD player, and sound signals corresponding to the respective video signals.

The video processor (not illustrated) performs signal processing, such as video decoding, video scaling, and Frame Rate Conversion (FRC) with respect to the video signal or broadcasting content input from the video inputter. Further, the video processor (not illustrated) may generate a video signal that is obtained by converting the input video into a form that is appropriate to the LCD panel (not illustrated) or OLED panel, and may generate a brightness control signal of the BLU.

Although not illustrated, the power supply 100 may further include a voltage sensor (not illustrated) for overvoltage protection.

FIG. 6 is a flowchart illustrating a method for controlling a power supply according to an exemplary embodiment.

According to the method for controlling a power supply including the input capacitor and the output capacitor as illustrated in FIG. 6, a DC voltage is input (S610). Here, the power supply may receive the DC voltage from the power source through the inputter. The input capacitor denotes the capacitance between the input terminals of an ideal capacitor (e.g., across a vacuum tube), and if a voltage is applied thereto, the input capacitor can store the voltage that is applied from the DC power as storing the charge therein.

The input DC voltage is converted so as to correspond with a reference voltage (S620). The power supply may convert the input DC voltage to correspond to the reference voltage. Here, the converter includes the output capacitor, and may convert the input DC voltage to output the converted DC voltage.

The converter may be implemented as a DC-DC converter, for example, a circuit, such as a buck converter, a synchronous buck converter, or a boost converter. Moreover, a switching type PWM converter may also be used.

Specifically, the DC-DC converter denotes an electronic circuit device that converts a DC power of a certain voltage into a DC power of another voltage.

Accordingly, the converter, which may be implemented as the DC-DC converter, may serve to convert the voltage input from a DC voltage source into a DC voltage of a different voltage.

On the other hand, the switching type PWM converter controls the switch using a PWM signal, and may make an average value of the output voltages become the DC voltage.

The controller may control the converter to output a voltage corresponding to the reference voltage. Here, when the reference voltage is changed, the controller may control the converter to provide the voltage stored in the output capacitor to the input capacitor based on the change reference voltage.

Further, the converting (S620) may generate a PWM signal for alternately controlling the first and second switches included in the converter based on the current offset, the detected inductor current, the detected output capacitor voltage, and the changed reference voltage.

Then, the converted voltage is output (S630). The power supply may output the converted voltage.

FIG. 7 is a flowchart illustrating a procedure of generating a current offset and a PWM signal according to an exemplary embodiment. The procedure generates the current offset and the PWM signal to provide the voltage stored in the output capacitor of the power supply to the input capacitor.

The level of the input DC voltage that is stored in the input capacitor is adjusted (S710). The power supply may adjust the level of the input Dc voltage that is stored in the input capacitor. Here, the power supply may include a regulator that adjusts the input DC voltage and provides the adjusted DC voltage to the input capacitor.

The regulator serves to keep a constant voltage even if the incoming voltage is changed or the current consumption is changed. Accordingly, the power supply may adjust the level of the input DC voltage that is stored in the input capacitor using the regulator to store the voltage provided from the output capacitor in the input capacitor.

The inductor current and the output capacitor voltage is detected (S720). The power supply may detect the inductor current and the output capacitor voltage.

A current offset is generated (S730). The power supply may generate the current offset.

Here, the power supply may detect the current flowing through the inductor included in the converter and the voltage of the output capacitor, and may generate the current offset for changing the direction of the current flowing though the inductor based on the reference voltage.

The power supply may generate the PWM signal for alternately controlling the first and second switches included in the converter based on the current offset, the detected inductor current, the detected output capacitor voltage, and the changed reference voltage.

Here, the PWM signal may include a PWM_H signal for turning on/off the first switch and a PWM_L signal for turning on/off the second switch.

The reference voltage and the current offset are kept constant in the same frame period, but may be changed when the frame is changed.

Specifically, in the same frame period, when the image information is not changed, the reference voltage is kept constant, and thus the converter is not controlled to provide the voltage stored in the output capacitor to the input capacitor. However, when the frame is changed, the image information may be changed, and thus the reference voltage may be changed. Accordingly, the controller may control the converter to provide the voltage stored in the output capacitor to the input capacitor based on the changed reference voltage.

A voltage corresponding to the duty ratio of the PWM signal may be output through adjustment of the duty ratio of the PWM signal (S740). The power supply may adjust the duty ratio of the PWM signal based on the change reference voltage and may output the voltage corresponding to the adjusted PWM duty ratio to the light source. Here, the duty ratio denotes the ratio of occupation of an ON signal in the PWM signal of one period. A desired voltage can be output according to the ratio of occupation of the ON signal.

Further, according to an exemplary embodiment, a non-transitory computer readable recording medium, in which a program for executing the power supply or the method for driving the display device as described above is stored, may be provided.

The non-transitory computer readable medium is not a medium that stores data for a short period, such as a register, a cache, or a memory, but denotes a medium which semi-permanently stores data and is readable by a device. Specifically, various applications and programs as described above may be stored and provided in the non-transitory computer readable medium, such as, a CD, a DVD, a hard disc, a Blu-ray disc, a USB, a memory card, and a ROM.

Further, although a bus is not illustrated in the above-described block diagram illustrating the display device and the power supply, communication between the respective constituent elements in the display device and the power supply may be performed through a bus. Further, each device may further include a processor, such as a central processing unit (CPU) or a microprocessor for performing the above-described procedures.

While the disclosure has been shown and described with reference to certain exemplary embodiments thereof, it will be understood by those skilled in the art that various changes in form and detail may be made therein without departing from the spirit and scope of the present disclosure, as defined by the appended claims.

What is claimed is:

1. A power supply comprising:
    an inputter comprising an input capacitor, the inputter being configured to receive an input DC voltage;
    a converter comprising an inductor and an output capacitor, the converter being configured to convert the input DC voltage and output the converted input DC voltage; and
    a controller configured to control the converter to convert the input DC voltage corresponding to a reference voltage, the controller comprising:
        a variable voltage driving circuit configured to change the reference voltage, and generate a current offset for changing a direction of current flowing through the inductor, in response to the reference voltage being changed;
        an adder configured to add the current offset and the current flowing through the inductor to generate a value;
        a current detector configured to detect the value of the addition of the current offset and the current flowing through the inductor; and
        a pulse width modulation (PWM) signal generator configured to control the converter to provide a voltage stored in the output capacitor to the input capacitor, based on the changed reference voltage and the detected value.

2. The power supply as claimed in claim 1, wherein:
    the inputter further comprises a regulator configured to:
        adjust the input DC voltage; and
        provide the adjusted input DC voltage to the input capacitor; and
    the controller, in order to store the voltage provided from the output capacitor in the input capacitor, is further configured to control the regulator to adjust a level of the input DC voltage that is stored in the input capacitor.

3. The power supply as claimed in claim 1, wherein the converter comprises:
    a first switch having a first end connected to a first end of the input capacitor;
    a second switch having a first end connected to a second end of the first switch and a second end connected to a second end of the input capacitor;
    the inductor having a first end connected to the second end of the first switch and the first end of the second switch; and
    the output capacitor having a first end connected to a second end of the inductor and a second end connected to the second end of the second switch.

4. The power supply as claimed in claim 3, wherein the controller further comprises a voltage detector configured to detect the voltage of the output capacitor, and
    the PWM signal generator is further configured to generate a PWM signal for alternately controlling the first switch and the second switch based on the detected value of the addition of the current offset and the current flowing through the inductor, the detected voltage, and the changed reference voltage.

5. The power supply as claimed in claim 4, wherein the PWM signal generator is further configured to:
    adjust a duty ratio of the PWM signal based on the changed reference voltage; and
    output a voltage corresponding to the adjusted duty ratio.

6. The power supply as claimed in claim 1, wherein the variable voltage driving circuit is further configured to output the current offset to the adder in synchronization with a time point when the changed reference voltage is input to the PWM signal generator.

7. The power supply as claimed in claim 1, wherein the reference voltage and the current offset are kept constant in a same frame period, and are changeable when a frame is changed.

8. The power supply as claimed in claim 1, wherein the controller further comprises:
    a voltage detector configured to detect the voltage of the output capacitor;
    a first comparator configured to determine whether the detected value of the addition of the current offset and the current flowing through the inductor is equal to a reference value; and
    a second comparator configured to determine whether the changed reference voltage is less than the detected voltage,
    wherein in response to the first comparator determining that the detected value is equal to the reference value and the second comparator determining that the changed reference voltage is less than the detected voltage, the PWM signal generator is further configured to control the converter to provide the voltage stored in the output capacitor to the input capacitor.

9. A display device comprising:
a display panel; and
a power supply configured to supply power corresponding to a reference voltage to the display panel, the power supply comprising:
   an inputter comprising an input capacitor, the inputter being configured to receive an input DC voltage;
   a converter comprising an output capacitor and an inductor, the converter being configured to convert the input DC voltage and output the converted input DC voltage; and
   a controller comprising:
      a variable voltage driving circuit configured to change the reference voltage, and generate a current offset for changing a direction of current flowing through the inductor, in response to the reference voltage being changed;
      an adder configured to add the current offset and the current flowing through the inductor to generate a value;
      a current detector configured to detect the value of the addition of the current offset and the current flowing through the inductor; and
      a pulse width modulation (PWM) signal generator configured to control the converter to provide a voltage stored in the output capacitor to the input capacitor, based on the changed reference voltage and the detected value.

10. A method for controlling a power supply comprising an input capacitor, an output capacitor, and an inductor, the method comprising:
   receiving a DC voltage;
   converting the DC voltage corresponding to a reference voltage;
   outputting the converted DC voltage;
   changing the reference voltage;
   generating a current offset for changing a direction of current flowing through the inductor, in response to the reference voltage being changed;
   adding the current offset and the current flowing through the inductor to generate a value;
   detecting the value of the addition of the current offset and the current flowing through the inductor; and
   providing a voltage stored in the output capacitor to the input capacitor, based on the changed reference voltage and the detected value.

11. The method for controlling a power supply as claimed in claim 10, further comprising:
   adjusting a level of the DC voltage that is stored in the input capacitor in order to store the voltage provided from the output capacitor in the input capacitor.

12. The method for controlling a power supply as claimed in claim 10, further comprising:
   detecting a voltage of the output capacitor,
   wherein the providing comprises generating a PWM signal for alternately controlling a first switch and a second switch included in a converter based on the detected value of the addition of the current offset and the current flowing through the inductor, the detected voltage, and the changed reference voltage.

13. The method for controlling a power supply as claimed in claim 12, further comprising:
   adjusting a duty ratio of the PWM signal based on the changed reference voltage; and
   outputting a voltage corresponding to the adjusted duty ratio.

14. The method for controlling a power supply as claimed in claim 10, wherein the reference voltage and the current offset are kept constant in a same frame period, and are changeable when a frame is changed.

15. A power supply comprising:
   an input capacitor configured to receive an input DC voltage;
   a converter comprising an output capacitor and an inductor, the converter being configured to convert the input DC voltage into an output DC voltage; and
   a controller comprising:
      a variable voltage driving circuit configured to change the reference voltage, and generate a current offset for changing a direction of current flowing through the inductor, in response to the reference voltage being changed;
      an adder configured to add the current offset and the current flowing through the inductor to generate a value;
      a current detector configured to detect the value of the addition of the current offset and the current flowing through the inductor; and
      a pulse width modulation (PWM) signal generator configured to control the converter to provide a voltage stored in the output capacitor to the input capacitor, based on the changed reference voltage and the detected value.

16. The power supply as claimed in claim 15, wherein:
the converter further comprises a first switch and a second switch; and
the PWM signal generator is further configured to generate a first PWM signal that controls the first switch and a second PWM signal that controls the second switch.

17. The power supply as claimed in claim 16, wherein the PWM signal generator is further configured to control the first PWM signal and the second PWM signal such that duty ratios of the first PWM signal and the second PWM signal depend on each other.

18. The power supply as claimed in claim 17, wherein:
in response to the PWM signal generator increasing a duty ratio of the first PWM signal, the PWM signal generator is further configured to decrease the duty ratio of the second PWM signal; and
in response to the PWM signal generator decreasing a duty ratio of the first PWM signal, the PWM signal generator is further configured to increase the duty ratio of the second PWM signal.

* * * * *